United States Patent Office

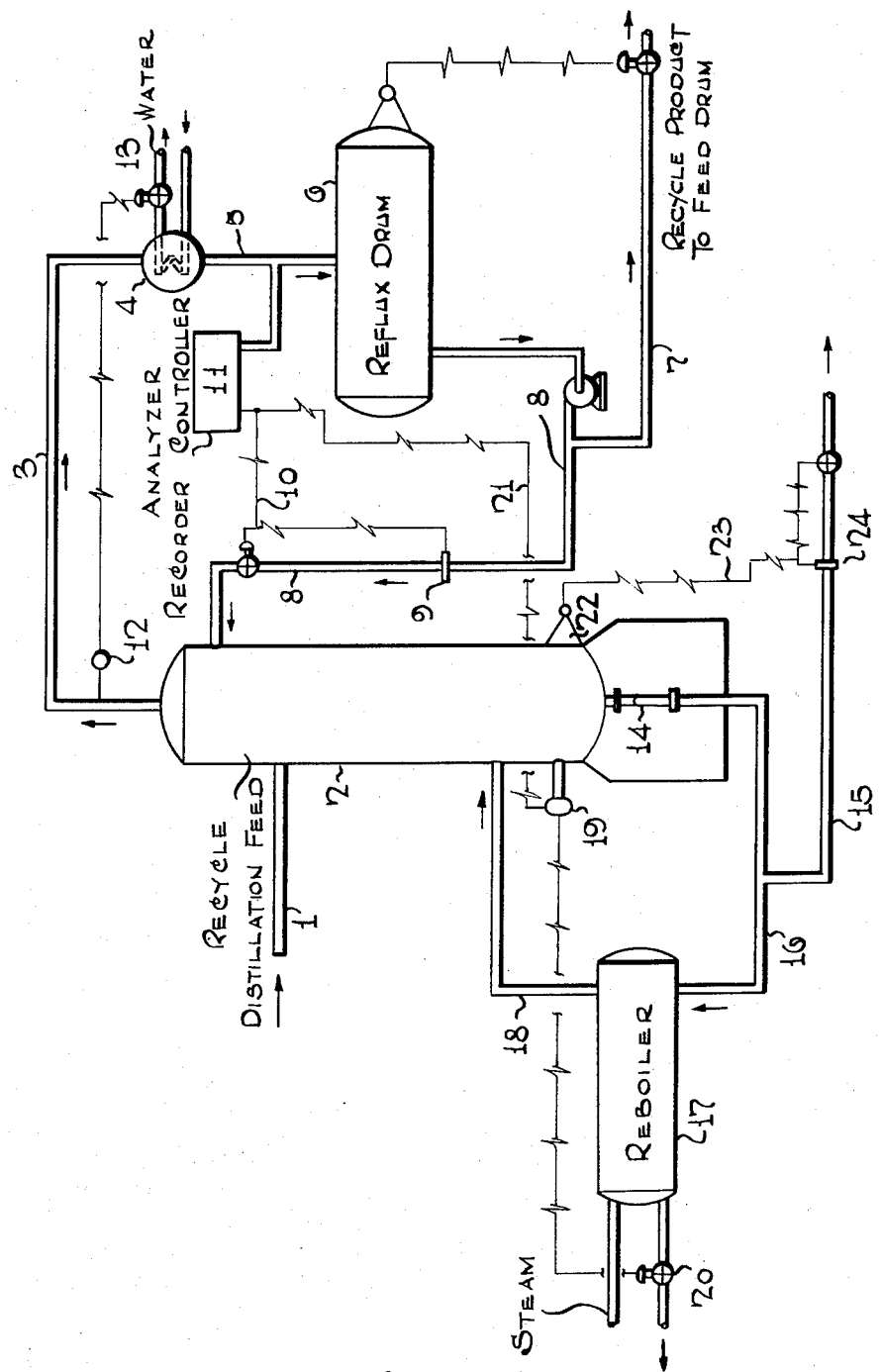

2,995,544
Patented Aug. 8, 1961

2,995,544
CONTROL OF BUTYL RUBBER POLYMERIZATION REACTION
Valrie E. Bourgeois, Baton Rouge, La., assignor to Esso Research and Engineering Company, a corporation of Delaware
Filed Nov. 18, 1952, Ser. No. 321,184
4 Claims. (Cl. 260—85.3)

This invention relates to an improvement in controlling the polymerization reaction involved in manufacturing the new synthetic rubber called butyl rubber, which is a copolymer of a major proportion of isobutylene and a minor proportion of a diolefin such as isoprene or butadiene.

The manufacture of butyl rubber is described in the Thomas and Sparks Patent 2,356,128, and consists essentially in copolymerizing isobutylene with a small amount of isoprene, or equivalent materials in the presence of several volumes of a lower alkyl halide such as methyl chloride, at a temperature substantially below 0° C. such as −80° C. or preferably −100° C., by using a catalyst a solution of a Friedel Crafts catalyst in methyl chloride or ethyl chloride.

Although some variations are possible in the methods of recovering the resultant synthetic rubber, from the reaction mixture, the preferred commercial method is to inject the cold reaction mixture, consisting largely of the methyl chloride solvent, together with unreacted isobutylene and diolefin, e.g. isoprene, and finely divided high molecular weight copolymer particles suspended in said liquid materials as a slurry, directly into a flash tank containing hot water. Here, the polymer particles become suspended in water as an aqueous slurry, and all of the volatile materials flash off as vapors, which then generally are condensed and subjected to distillation and other optional purification steps for recycling to the polymerization reactor. For instance, the Green et al. Patent 2,399,672 describes such a recycling process in which the vapors from the flash tank are first subjected to cooling in several stages to remove small amounts of moisture and dried by passing through alumina gel or other suitable drying substance, then condensed and passed into a preliminary distillation column from which a small amount of relatively pure methyl chloride is removed overhead for use in catalyst preparation, the bulk of the materials being removed as bottoms from said column and passed into a recycle distillation tower. The primary purpose of this recycle distillation tower is to redistill the recycle materials before returning them to the reactor, in order to remove, as bottoms, the dimers, trimers, or other low molecular weight undesired polymerization products, which tend to poison the polymerization reaction, and to remove the unreacted isoprene so that it can be recovered and metered into the system in a concentrated form for control purposes, and to remove along with those heavier materials a small amount of $C_4$ compounds such as normal butenes, i.e. butene-1 and butene-2, as well as butane, and even isobutane, with of course a small amount of isobutylene and methyl chloride. These bottoms may of course be fractionated and otherwise treated or purified, if desired, and either recycled or purged from the system. Generally, a small amount of the bottoms are recycled into the lower part of the recycle distillation tower through a reboiler for temperature control.

The overhead product from this recycle distillation tower consists chiefly of methyl chloride and isobutylene, and may constitute 95 to 98% of the total feed to the tower. This overhead vapor is then condensed and passed into a suitable reflux drum, from which a small portion is withdrawn and returned as reflux into the top of the recycle distillation tower. The bulk of the overhead condensate is recycled to a polymerization feed storage tank, for use in supplying one or more polymerization reactors, as desired.

In the commercial operation of butyl rubber manufacturing plants, the molecular weight, and other characteristics of the resulting butyl rubber are found to vary according to the concentration of the small amount of normal butylenes, which behave as polymerization poisons, in the reactor feed mixture. Commercially, with a recycle system such as described above, the concentration of normal butylenes in the reactor feed has been controlled primarily by controlling the amount of $C_4$ purge from the recycle system, meaning that any normal butenes which are not purged or discarded are of course put back into the recycle system, and thus reappear in the polymerization feed.

It is also found that the molecular weight and unsaturation of the resulting synthetic rubber are affected to a substantial extent by the hydrocarbon-solvent ratio in the polymerization feed. Assuming that the feed composition variables are constant, i.e. the proportion of isobutylene to isoprene, and catalyst amount, the concentration of normal butylenes in the reactant mixture will in turn control the hydrocarbon concentration in the reaction mixture at which a butyl rubber of a desired molecular weight and unsaturation is produced. Plant experience has demonstrated that the performance of the reactors, as measured by production rate and length of run before requiring cleaning of the reactor, is affected markedly by the hydrocarbon concentration of the reacting mixture.

Since fouling of the heat transfer surfaces of the reactors occurs, by deposition of polymer thereon, the length of a polymerization operation on a continuous basis, may be limited to some period such as 20 to 30 hours, at the end of which the run must be discontinued in order to clean the reactor. Commercially, it is therefore feasible to provide a plurality of reactors, so that there will always be one or two or more reactors operating simultaneously while another reactor is being cleaned. On the other hand, there need not be a separate recycle distillation and purification system for each reactor, but one such system is generally made to take care of the products from all of the reactors in any particular plant. This means, however, that the recycle load, consisting of solvent and unreacted hydrocarbon, required to be handled by the recycle system, will fluctuate from time to time when one or more of the reactors are shut down for cleaning, resulting in a surge in the recycle rate. Furthermore, even in a plant with three reactors, where one is being cleaned, it is possible that one of the two operating reactors may occasionally become plugged or otherwise inoperative prior to completion of the normal running cycle, i.e. before the reactor being cleaned is ready to be put back in operation, and this of course results in a change to a recycle rate equal only to the feed of the one operating reactor. Because of these inherent fluctuations in recycle rate, the load to the recycle distillation tower system fluctuates over a wide range. Consequently, as the load to the main recycle distillation tower changes, the fractionating efficiency changes, and the compositions of the overhead and bottoms streams change.

The present invention comprises a system for maintaining a constant hydrocarbon concentration in the overhead from the recycle distillation tower, at all times regardless of variations in the recycle rates or loads going to this distillation tower. The invention provides analyzing means for continuously and automatically analyzing the hydrocarbon-solvent ratio, e.g. the isobutylene-methyl chloride ratio, of the recycle distillation tower overhead, and providing means or system for making said analyzing means continuously and automatically adjust the recycle distillation tower operating conditions to maintain the overhead at a constant hydrocarbon-solvent ratio. This may be accomplished in various ways. The preferred hydrocarbon-solvent analyzing means is a thermalconductivity recording analyzer e.g., Leeds & Northrop Thermal Conductivity Analyzer, Model No. 7801. Other means may also be used for continuously and automatically analyzing the ratio of isobutylene to methyl chloride in the recycle distillation tower overhead. Various methods may also be used for making such a continuous automatic analyzer do the automatic controlling of one or more of the operating conditions of the recycle distillation tower. One successful method is to connect the thermalconductivity recording analyzer electrically with a flow recorder controller on the reflux to the recycle distillation tower. By this method, if the proportion of hydrocarbon in the distillation tower overhead condensate increases above the desired predetermined ratio, the analyzer controller will automatically reset the reflux flow recorder controller to cause an increase in the amount of reflux and thereby effect a slight increase in the distillation efficiency at the top of the tower, thereby causing a corresponding slight decrease in the proportion of hydrocarbon in the overhead distillate. Vice versa, if the proportion of hydrocarbon in the overhead condensate decreases, the analyzer recording controller will automatically make a slight reduction in the reflux flow. The result is the maintenance of a substantially constant hydrocarbon-solvent (i.e. isobutylene-$CH_3Cl$) ratio in the recycle distillation tower overhead.

Successful control of the overhead composition has also been obtained by an arrangement whereby the analyzer controller resets a temperature controller on the tower bottoms, which in turn resets a flow recorder controller on the steam supply to the tower reboiler. This is effected continuously and automatically merely by electrical connection of the analyzer recording controller to the temperature recording controller. By this means, if the proportion of hydrocarbon in the distillation tower overhead increases slightly, it will automatically make a slight lowering of the temperature setting on the temperature recorder controller, and thereby automatically reduce the amount of steam flowing to the reboiler which is used for maintaining the desired temperature in the lower part of the distillation tower.

Thus, the invention has a number of advantages including at least the following:

(1) It provides for automatic control of the hydrocarbon concentration in the recycle stream, and automatic control of the $C_4$ purge rates, thus relieving the operator of the duty of making frequent adjustments.

(2) It provides much more uniform control of hydrocarbon concentration in the recycle stream than has been obtained heretofore by any other means.

(3) The improved constancy of recycle composition permits operation of the reactors at a relatively constant hydrocarbon concentration in the reactant mixture, which concentration can therefore be maintained near the optimum established by plant practice for obtaining maximum reactor production performance.

(4) By decreasing the variations in reactor feed quality and composition, more uniform product quality is achieved.

The details of the operation and advantages of the invention will be better understood from the following description read in conjunction with the accompanying drawing which presents a schematic diagram of a recycle distillation tower, with reboiler and reflux, and with an analyzer recorder controller and suitable instrumentation for effecting the continuous control by both of the specific methods described above.

Referring to the accompanying drawing, recycle distillation feed comes through line 1 from a butyl rubber polymerization system, not shown, comprising one or more reactors, a flash tank, and condenser, with or without optional water knock-out drums, coolers, and driers. For illustration, the invention is applied to the production of butyl rubber by copolymerizing a major amount such as 97% of isobutylene with a minor amount such as 3% by weight of isoprene, in the presence of two to three volumes of methyl chloride per volume of hydrocarbon reactants. The isobutylene used should ordinarily have a purity of about 95% to 99% or higher, the remainder comprising small amounts of isobutane, normal butylenes, with perhaps traces of trimethylethylene and other $C_5$ and heavier hydrocarbons, and a trace of moisture. Some of these impurities may be removed by distillation or other purification steps prior to polymerization.

The isoprene used commercially should have a purity of at least 85%, and preferably at least 95 to 99%; impurities which may be present include other $C_5$ diolefins and olefins, traces of polymer, etc. with or without a small amount of polymerization inhibitor. Such impurities and inhibitor, if present are preferably removed by suitable washing, treating, distillation, or other suitable purification prior to polymerization.

After the polymerization reaction mixture has been flashed into hot water, the vapors of methyl chloride with unreacted isobutylene and isoprene, constituting the recycle gases, are condensed and fed in liquid phase through line 1 into recycle distillation tower 2. From this tower the overhead vapors are taken through line 3 through condenser 4 and line 5 into reflux drum 6, from which the major part of the condensate is taken through line 7 and recycled to a polymerization feed storage tank not shown. Also, a portion of the condensate is taken from reflux drum 6 through line 8 back into the top of the distillation tower 2, to serve as reflux. A flow recording controller 9 is inserted in line 8 to control the amount of reflux and, as one of the primary features of the invention, this flow recorder controller 9 is electrically connected by wiring 10 and automatically and continuously governed by, the analyzer recorder controller 11. A pressure recording controller 12 may be inserted in line 3 at the top of the distillation tower 2 in order to regulate the flow of condenser water through valve 13.

The bottoms from the recycle distillation tower 2 are discharged through line 14, and the major proportion thereof are passed through line 15 to further distillation and treating equipment not shown, for recovering the small amount of methyl chloride therein, as well as isoprene, and to purge undesired $C_4$ normal olefins, or other undesired impurities. A minor portion of the distillation bottoms coming through line 14 are recycled through line 16 into reboiler 17 where it is heated, and then passed through line 18 back into the lower part of the recycle distillation tower 2, in order to control the distillation temperature. A temperature recording controller 19 may be inserted in the lower part of the distillation tower 2 in order to automatically, i.e. thermostatically, control the amount of steam used in the reboiler 17, by means of the flow recording controller 20.

As another primary feature of the invention, the temperature recording controller 19 may be electrically connected, by wiring 21 to the analyzer recorder controller 11, so that fluctuations of the latter will automatically reset the temperature recording controller 19.

If desired, a level indicator controller 22 may be inserted at the lower part of the distillation tower 2 and may be used to operate, through wiring 23 the flow recording controller valve 24.

Thus, by the illustrated system, two modifications of the invention are shown for continuously and automatically maintaining a constant hydrocarbon concentration in the recycle distillation tower condensate.

What is claimed is:

1. In the process of making a butyl synthetic rubber of a major proportion of isobutylene and a minor proportion of a diolefin of 4 to 6 carbon atoms, by copolymerization of said hydrocarbons at a temperature below −40° F., in the presence of about 1 to 3 volumes of methyl chloride per volume of hydrocarbon reactants, and in the presence of a Friedel-Crafts catalyst dissolved in methyl chloride, recovering the synthetic rubber from the cold reaction liquid by injecting the reaction mixture into a tank of hot water, whereby unreacted hydrocarbons and methyl chloride solvent are vaporized and subsequently condensed and subjected to distillation to remove as bottoms a small proportion of undesirable low molecular weight polymers together with undesirable impurities including normal butenes, and most of any $C_5$ hydrocarbons present, the bulk of the overhead from said distillation tower being methyl chloride and isobutylene, the proportion of these latter two materials being subject to substantial variation owing to variations in the volume of feed coming to said distillation tower and to slight variations in the composition of said feed, said tower overhead vapors being withdrawn and condensed, and a minor proportion of the condensate being returned to the top of the distillation tower as reflux, and the major proportion of said condensate being recycled for use as polymerization feed, the improvement comprising continuously and automatically analyzing the hydrocarbon-solvent ratio of said recycle distillation tower overhead condensate by analyzing means, and using said analyzing means to automatically adjust by electrical control the operating conditions of said recycle distillation tower whereby if the proportion of hydrocarbon in the distillation tower overhead condensate increases above the desired predetermined ratio, the distillation efficiency of the distillation tower will be automatically slightly increased, by lowering the reboiler temperature, and vice versa if the proportion of hydrocarbon in the distillation tower overhead condensate decreases below the desired predetermined ratio, to automatically continuously maintain a constant hydrocarbon-solvent ratio in said recycle distillation tower overhead product, whereby more uniform copolymerization performance is obtained and more uniform synthetic rubber product quality is achieved.

2. Process according to claim 1 in which the hydrocarbon-solvent ratio analyzing means used is a thermal conductivity recording controller.

3. Process according to claim 1 in which the analyzing recording controller is used to continuously and automatically adjust the temperature recording controller at the lower part of the distillation tower, and thereby automatically control the amount of steam used to heat the reboiler.

4. In the process of making a butyl synthetic rubber of a major proportion of isobutylene and a minor proportion of a diolefin of 4 to 6 carbon atoms, by copolymerization of said hydrocarbons at a temperature below −40° F., in the presence of about 1 to 3 volumes of methyl chloride per volume of hydrocarbon reactants, and in the presence of a Friedel-Crafts catalyst dissolved in methyl chloride, recovering the synthetic rubber from the cold reaction liquid by injecting the reaction mixture into a tank of hot water, whereby unreacted hydrocarbons and methyl chloride solvent are vaporized and subsequently condensed and subjected to distillation to remove as bottoms a small proportion of undesirable low molecular weight polymers together with undesirable impurities including normal butenes, and most of any $C_5$ hydrocarbons present, the bulk of the overhead from said distillation tower being methyl chloride and isobutylene, the proportion of these latter two materials being subject to substantial variation owing to variations in the volume of feed coming to said distillation tower and to slight variations in the composition of said feed, said tower overhead vapors being withdrawn and condensed, and a minor proportion of the condensate being returned to the top of the distillation tower as reflux, and the major proportion of said condensate being recycled for use as polymerization feed, the improvement comprising continuously and automatically analyzing the hydrocarbon-solvent ratio of said recycle distillation tower overhead condensate by analyzing means comprising a thermal conductivity recording controller, and using said analyzing means to automatically adjust by electrical control the operating conditions of said recycle distillation tower whereby if the proportion of hydrocarbon in the distillation tower overhead condensate increases above the desired predetermined ratio, the distillation efficiency of the distillation tower will be automatically slightly increased, by lowering the reboiler temperature, and vice versa if the proportion of hydrocarbon in the distillation tower overhead condensate decreases below the desired predetermined ratio, the distillation efficiency of the distillation tower will be automatically slightly reduced by raising the reboiler temperature to automatically continuously maintain a constant hydrocarbon-solvent ratio in said recycle distillation tower overhead product, whereby more uniform copolymerization performance is obtained and more uniform synthetic rubber product quality is achieved.

References Cited in the file of this patent
UNITED STATES PATENTS
2,399,672    Green _____ May 7, 1946
OTHER REFERENCES
Chemical Engineering (Minneapolis-Honeywell), vol. 58, page 49 (August 1951).
Chemical and Engineering News (vol. 32, page 3384), August 23, 1954.